United States Patent [19]

Hawks

[11] 4,003,540

[45] Jan. 18, 1977

[54] AERIAL MOUNT

[75] Inventor: Herbert H. Hawks, Syracuse, Ind.

[73] Assignee: Nite Hawk Enterprises, Inc., Syracuse, Ind.

[22] Filed: Oct. 31, 1975

[21] Appl. No.: 627,592

[52] U.S. Cl. .............................. 248/539; 248/226.1

[51] Int. Cl.$^2$ .............................. F16M 13/00

[58] Field of Search .......... 248/43, 226 B; 343/713, 343/715, 720, 880, 882, 883

[56] References Cited

UNITED STATES PATENTS

| | | | |
|---|---|---|---|
| 462,319 | 11/1891 | Loehner et al. | 248/226 B |
| 1,162,608 | 11/1915 | Hohl | 248/43 X |
| 1,610,730 | 12/1926 | Baler | 248/407 UX |
| 2,093,951 | 9/1937 | Bosket | 248/43 X |
| 2,524,461 | 10/1950 | McDowell | 248/226 B X |
| 3,056,570 | 10/1962 | Slavin | 248/226 B X |
| 3,071,338 | 1/1963 | Kaufman et al. | 248/43 |
| 3,710,339 | 1/1973 | Rima | 343/715 |
| 3,899,148 | 8/1975 | Fleming | 248/43 |

*Primary Examiner*—William H. Schultz
*Attorney, Agent, or Firm*—Olsen and Stephenson

[57] ABSTRACT

A detachable aerial mount for use on trucks having rear view mirror brackets on opposite sides thereof. The mount has a spring-actuated clasping mechanism so that the driver of a truck can easily and quickly remove the aerial and the associated radio from the truck and transfer them to another truck that is to be driven by the driver.

4 Claims, 4 Drawing Figures

AERIAL MOUNT

BACKGROUND OF THE INVENTION

The present invention relates to a detachable aerial mount primarily adapted for use on a truck.

It is conventional practice in the trucking industry for drivers of trucks to provide their own radio equipment and to transfer the equipment to the truck to which the driver may be assigned. These transfers may occur frequently, and the equipment available heretofore for use by the drivers has not been fully adequate for their needs, because time delays and inconveniences occur when it is necessary to disconnect the aerial and remove it and the radio from the one truck and then to remount the aerial and the radio in the other truck.

SUMMARY OF THE INVENTION

The present invention has overcome the inadequacies of the aerial mounts found in the prior art and provides a mount for an aerial that can be clamped onto a supporting structure of a truck, including a clamping mechanism which is spring-actuated so that the mount can readily be attached or removed from the truck with a minimum of effort.

According to one form of the present invention a detachable aerial mount is provided for snap-on attachment to structure of a motor vehicle, such as the external rear view mirror brackets, the mount comprising a pair of telescoping members having clasp means at the remote ends thereof, spring means urging the telescoping members toward one-another so that the clasp means can clamp the vehicle structure therebetween in response to the action of the spring means, and an aerial mounting bracket on one side of the telescoping members on which an aerial can be mounted. The clasp means are hook elements connected to the telescoping members for hooking onto the mirror brackets and be retained thereon by the spring means. An aerial mounting bracket is integrally connected to one of the telescoping members to which the aerial can be connected.

Thus, a simple low-cost device is provided which will enable the truck driver to disconnect his aerial readily from a truck and to remove the aerial and the mount together with the radio to another truck to which he may be assigned.

Accordingly, it is one of the objects of the present invention to provide an improved aerial mount which is characterized by its simple construction, low-cost, and the ease with which it can be connected to and disconnected from a truck.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 4:
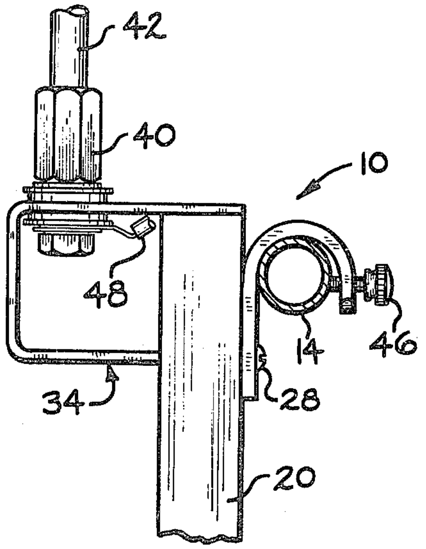
FIG. 4 is a fragmentary elevational view of the upper end of the aerial mount.
Figure 2:
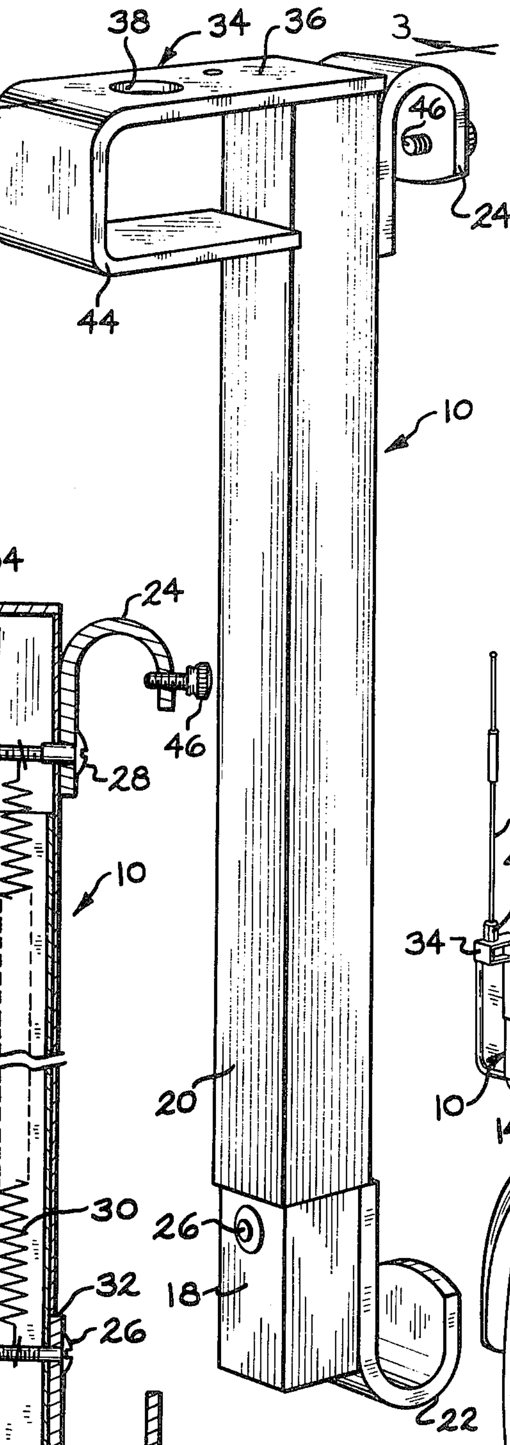
FIG. 2 is an enlarged perspective view of the aerial mount.
Figure 3:
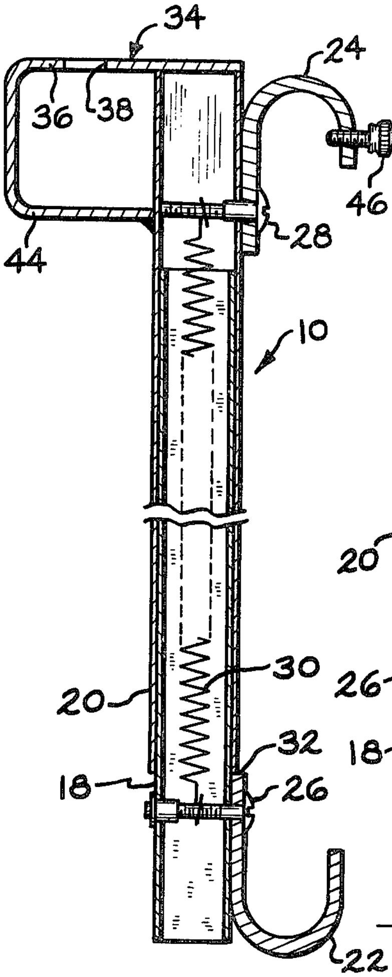
FIG. 3 is a vertical section taken on the lines 3—3 of FIG. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The detachable aerial mount 10 is primarily adapted for use on a motor vehicle or truck 12 which has rear view mirror brackets 14 for supporting a mirror 16. However, it will be recognized that other supporting structure of the truck 12 can also be used for supporting the aerial mount 10.

Figure 1:
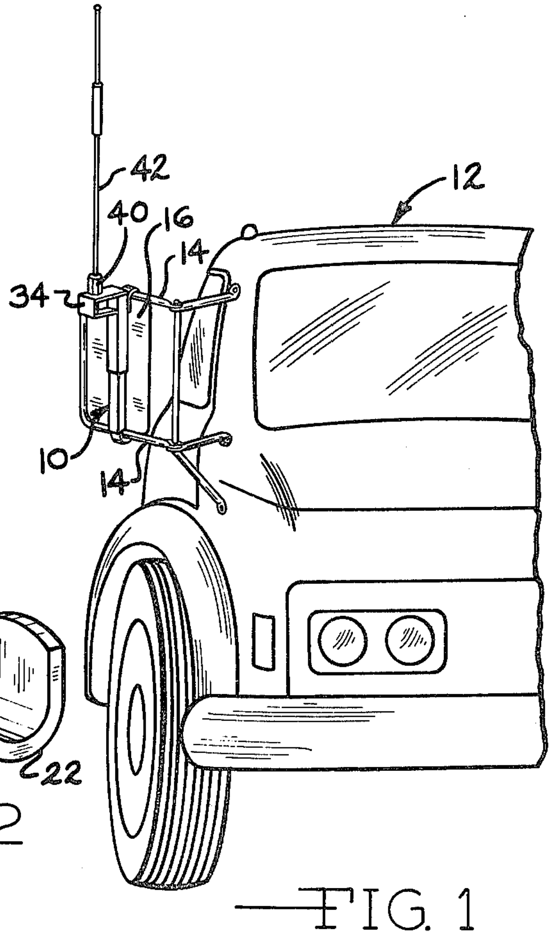
FIG. 1 is a fragmentary perspective view of a truck on which an aerial mount embodying the present invention is attached.

The aerial mount 10 includes a pair of telescoping members 18 and 20 which have clasp means 22 and 24 at the remote ends thereof. The telescoping members 18 and 20 are adapted to be mounted in a vertical arrangement, as can be seen in FIG. 1, the lower telescoping member having a square tubular cross section and the upper telescoping member 20 having a relatively larger square tubular cross section for fitting over the lower telescoping member 18. The clasp means 22 is a hook element which is secured to the lower telescoping member 18 by the screw 26. The clasp means 24 is a hook element of similar configuration which has its open end facing downward toward the clasp means 22, and clasp means 24 is secured to the upper end of the upper telescoping member 20 by the screw 28.

The screws 26 and 28 extend transversely through the interior of their respective telescoping members 18 and 20, and these screws 26 and 28 also function to provide supports for retaining the opposite ends of the spring means or coil spring 30 which normally urges the telescoping members 18 and 20 together to a position wherein the upper telescoping member 20 is seated against the clasp means 22, as at 32.

The aerial mount 10 also includes the aerial mounting bracket 34 integrally connected to the upper telescoping member 20 and on which an aerial can be mounted. For this purpose, the mounting bracket 34 includes a top plate 36 which closes the upper end of the telescoping member 20 and extends laterally therefrom and has the aperture 38 therein in which a receptacle 40 can be mounted for receiving the end of an aerial. Details of the receptacle 40 will not be described, because this is a conventional piece of equipment and the details form no part of the present invention. When the receptacle 40 is mounted in place, as shown in FIG. 4, the aerial 42 can be threadedly connected thereto in the conventional manner.

Preferably, the plate 36 has a return-bent portion 44 which is secured at its inner end to the upper telescoping member 20, and serves the dual function of reinforcing the plate 36 and also provides a closed loop within which the lower end of the aerial receptacle 40 is retained in a shielded manner.

To provide a proper electrical ground of the aerial mount 10 to the motor vehicle, the clasp means 24 has threadedly connected therein a thumb screw 46 which is adapted to be turned to provide a suitable electrical ground connection with the rear view mirror bracket 14.

When it is desired to mount the aerial 42 on a motor vehicle or truck 12, it is merely necessary that the telescoping members 18 and 20 be spread apart against the action of the coil spring 30 a distance sufficient to enable the aerial mount 10 to clamp onto the rear view mirror brackets 14 in the position shown in FIG. 1, and the radio, not shown, can be positioned within the cab of the truck 12 at any suitable location. Thereafter, if not already done, the aerial wire from the radio that normally is connected at 48 to the aerial receptacle 40 can be fastened, and the radio and aerial then are in position for use. If the aerial and radio are to be removed, this can readily be accomplished merely by removing the radio from the truck and at the same time spreading apart the telescoping members 18 and 20 an amount sufficient to remove them from the rear view mirror brackets 14.

It is claimed:

1. A detachable aerial mount for snap-on attachment to structure of a motor vehicle such as the external rear view mirror brackets, comprising a pair of telescoping members adapted to be mounted in vertical arrangement and having clasp means at the remote ends thereof, spring means urging said telescoping members together so that said clasp means can clamp said structure therebetween in response to the urging of said spring means, and an aerial mounting bracket on the upper one of said telescoping members on which an aerial can be mounted, said mounting bracket including a plate closing the upper end of said upper telescoping member and extending laterally therefrom and having a return-bent portion from its outer end which defines a closed loop below the plate on the side of said upper telescoping member, said plate having an aperture therein for mounting an aerial receptacle thereon within the confines of said loop.

2. The detachable aerial mount that is defined in claim 1, wherein said upper one of said clasp means has threadedly connected thereto a thumb screw adapted to be turned to clampingly engage said structure and provide an electrical ground connection with said structure.

3. The detachable aerial mount that is defined in claim 4, wherein the lower telescoping member has a square tubular cross section and the upper telescoping member has a larger square tubular cross section for fitting over the lower telescoping member, and said spring means comprises a coil spring extending lengthwise within said telescoping members, the lower end of the coil spring being connected to the lower end of the lower telescoping member and the upper end of the coil spring being connected to the upper end of the upper telescoping member.

4. The detachable aerial mount that is defined in claim 3, wherein said clasp means comprise hook elements connected at the lower and upper ends respectively of the lower and upper telescoping members by screws extending through the telescoping members, and said coil spring has its opposite ends supported on said screws.

* * * * *